Feb. 15, 1927.

C. NIEUKIRK 1,617,961

SURGICAL DEVICE

Filed July 27, 1925

Chloe Nieukirk
INVENTOR

BY Victor J. Evans
ATTORNEY

WITNESS: Gerald Hennessy

Patented Feb. 15, 1927.

1,617,961

UNITED STATES PATENT OFFICE.

CHLOE NIEUKIRK, OF UNION MILLS, INDIANA.

SURGICAL DEVICE.

Application filed July 27, 1925. Serial No. 46,419.

This invention relates to surgical devices and has especial relation to dilators for the treatment of hemorrhoids, an object being to provide a device of this character which may also be used for the treatment of the prostate gland and by means of which the muscles of the rectum may be dilated and the veins compressed so as to reduce the amount of blood in the surrounding tissues and prevent protrusion of the hemorrhoids.

Another object of the invention is the provision of a device which, in addition to the above and other uses, may be used for the application of heat or cold to the affected parts.

With the above and other objects in view, the invention further includes the following novel features and details of construction, to be hereinafter more fully described, illustrated in the accompanying drawings and pointed out in the appended claim.

In the drawings:—

Figure 1:
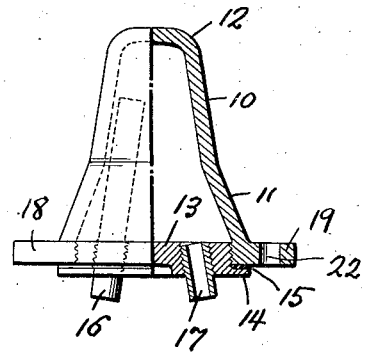
Figure 1 is an elevation partly in section showing the device constructed in accordance with the invention.
Figure 2:
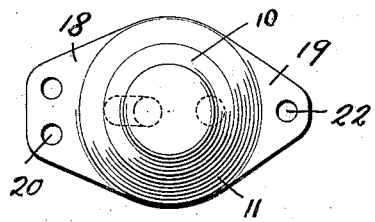
Figure 2 is a top plan view of the same.
Figure 3:
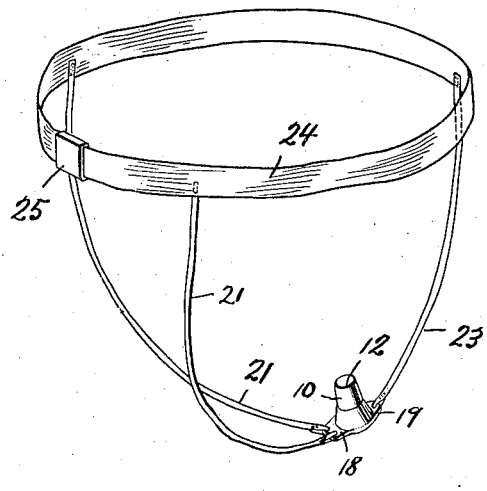
Figure 3 is a view illustrating the means of holding the device in place.

Referring to the drawings in detail wherein like characters of reference denote corresponding parts, the device as shown comprises a hollow substantially conical member whose inclined walls are shaped to provide an outer truncated conical section 10 and an inner truncated conical section 11, the degrees of pitch of which differ. The outer restricted end of the conical member is rounded as shown at 12 so as to facilitate its introduction into the rectum. The outer and inner truncated sections 10 and 11 of the dilator act to gradually expand or dilate the rectum. In fact, the outer section 10 is more or less of a gradual taper, while the inner section 11 is more or less abrupt. By this construction the walls of the rectum are gradually expanded at the entrance, in order to provide for a gradual subsequent expansion of the entrance, thereby allowing a full insertion of the dilator into its place, and hence facilitating the treatment of the prostate glands. Furthermore, by these two sections 10 and 11, the protrusion of the hemorrhoids is materially prevented, while the dilator is in place. The opposite end of the said member is closed by a removable plug 13 which has a threaded engagement with the inner end of the hollow member and which is provided with a flange 14. A gasket 15 is located between the flange and the adjacent portion of the conical member so as to provide a leakproof joint.

Carried by and extending through the plug 13 is a tube 16. This tube may have a threaded engagement with the plug 13 and extends inwardly to within a short distance of the inner end of the hollow member. The outer end of the tube 16 is designed for connection with a rubber tube or hose so that either hot or cold water may be directed into the member. The plug 13 also carries an outlet tube 17.

The hollow conical member is provided with oppositely located flanges 18 and 19, the former being provided with spaced openings 20 to provide means for the attachment of tapes 21, while the lug 19 is provided with a single opening 22 to provide for the attachment of one end of a tape 23. The tapes 21 and 23 are secured to a belt 24 and the latter may be provided with a suitable buckle 25.

In the use of the device, the conical member is inserted within the rectum, the straps 21 extending upwardly over the groin, while the strap 23 extends centrally of the back. The device will thus be held in proper position to exert pressure upon the muscles of the rectum and upon the hemorrhoids and will act to compress the veins and reduce the amount of blood in the surrounding tissues as well as to retain the hemorrhoids in place. By attaching a tube or hose to the tube 16, water of the desired temperature may be introduced into the device, the tube 16 extending upward so as to direct the water inward against the upper inner wall of the device, after which the water may be permitted to flow into a suitable receptacle.

The invention is susceptible of various changes in its form, proportions and minor details of construction and the right is herein reserved to make such changes as properly fall within the scope of the appended claim.

Having described the invention what is claimed is:—

A surgical device consisting of a hollow substantially tapered member having walls shaped to provide an outer truncated gradual conical section, whose restricted end is rounded to permit of an easy insertion thereof into the rectum and an inner truncated more abrupt conical section, the two sections constituting means to provide for two stages of dilation of the walls of the rectum, the end of the abrupt conical section having terminal extension flanges at diametrically opposite points, a plug removably threaded into the end of the abrupt conical section, a tube carried by and extending through the plug, and having its inner end spaced slightly from the inner restricted end of the interior of the conical member, said tube having its outer end adapted for connection with a flexible tube, a relatively short outlet tube fastened through the plug adjacent the rear of the interior of the dilator, thereby permitting a portion of the medical solution to collect to the front of the interior of the dilator, and means connecting with the extension flanges and fitting the body of the user, to hold the dilator in place.

In testimony whereof I affix my signature.

CHLOE NEUKIRK.